No. 802,600. PATENTED OCT. 24, 1905.
D. R. & O. D. SALISBURY.
TIRE.
APPLICATION FILED JAN. 4, 1905.

UNITED STATES PATENT OFFICE.

DAVID R. SALISBURY AND OLIVER D. SALISBURY, OF OWOSSO, MICHIGAN.

TIRE.

No. 802,600. Specification of Letters Patent. Patented Oct. 24, 1905.

Application filed January 4, 1905. Serial No. 239,546.

*To all whom it may concern:*

Be it known that we, DAVID R. SALISBURY and OLIVER D. SALISBURY, citizens of the United States, residing at Owosso, in the county of Shiawassee and State of Michigan, have invented certain new and useful Improvements in Tires, of which the following is a specification.

Our invention relates to tires, and especially to pneumatic tires, particularly adaptable for use upon heavy vehicles.

As is well known, it is customary to make all pneumatic tires of rubber and fabric. For tires upon light vehicles rubber tires serve the purpose admirably, but on heavy vehicles the rubber is found to be too soft and quickly disabled through wear and punctures in consequence thereof.

The principal object of our invention is to provide a tire with an outer casing of leather, which resists wear in a considerable degree.

A further object of our invention is to provide a tire with a removable leather tread-strip secured thereto.

A further object of our invention is to provide a tire in a form which may be quickly and easily secured to the rim of a wheel and with a great degree of permanency.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a view of our improved tire in cross-section. Fig. 2 is a sectional view of our improved tire taken on line 2 2 of Fig. 1 and on the plane of the wheel to which it is secured.

Like characters of reference designate corresponding parts throughout the several views.

In its preferred embodiment our improved tire comprises an inner tube 1, with an outer casing 2, of leather, surrounding the said inner tube upon the sides and adjacent the tread. The outer casing 2 is provided with outwardly-turned edges 3, and between the said inner tube 1 and casing 2 is interposed a plurality of convolutions of fabric 4. Adjacent the tread and between the fabric and the casing is disposed a strengthening-strip 5, also of leather, and having its edges beveled, so that when disposed in the tire the said strip 5 is crescent-shaped, as seen in cross-section. A binding-band 6, also of leather, connects the outturned edges 3, and the edges of said bands 6 extend outwardly coincident with and secured to the outturned edges 3. A rigid binding-strip 7, preferably of metal, surrounds and bears upon the annular shoulder formed by the outturned edges 3 of the casing 2. The binding-band 7 is provided with a plurality of holes, and registering holes are provided through the outturned edges of the casing 2 and the edges of the base-strip 6, through which may be passed bolts 8 to secure the tire upon a rim 9, mounted upon a wheel 10. Pressure is exerted upon the binding-strip 7 through the medium of the bolts 8 by means of the nuts 11.

As the principal wear upon the tire is at the tread, we provide a tread-strip 12 removably secured to the casing 2, adapted to receive the wear and made from a leather possessing wearing qualities in a high degree, as "oak-tanned" leather. It is found desirable, also, to interpose a filling material adjacent the base-strip, as at 13, to prevent the inner tube from entering the acute angle caused by the outturning of the edges 3. This filling 13 may be of fabric or other material, as desired.

From the foregoing description the use and operation of our improved tire will be fully and clearly understood without a more extended explanation thereof.

While we have described and prefer to make our tire of leather, it is of course obvious that other materials may be substituted therefor, and we do not confine ourselves to the use of such material.

Having thus described our invention, what we claim as novel, and desire to secure by Letters Patent, is—

1. A tire comprising an inner tube, a flexible outer casing inclosing said inner tube upon the sides and adjacent the tread and having outwardly-turned edges, a base-band connecting and having its edges secured to said outturned edges and means for securing said edges rigidly to the rim of a wheel.

2. A tire comprising an inner tube, an outer casing of leather inclosing said inner tube upon the sides and adjacent the tread and having outwardly-turned edges, a base-band connecting and having its edges secured to said outturned edges and means for securing said edges rigidly to the rim of a wheel.

3. A tire comprising a casing with outwardly-turned edges, a base-band connecting and having its edges secured to said outturned edges, a rigid binding-strip disposed upon said outturned edges and provided with openings registering with openings in the edges of the casing and the base-band and adapted to permit the passage therethrough of bolts to secure the tire to the rim of a wheel and means for inflating the casing.

4. A tire comprising an inner tube, a flexible outer casing inclosing said inner tube upon the sides and adjacent the tread and having outwardly-turned edges, a filling material interposed between the tube and the casing, a base-band connecting and having its edges secured to the outturned edges and a rigid binding-strip disposed upon said outturned edges and provided with openings registering with openings in the edges of the casing and the base-band and adapted to permit the passage therethrough of bolts to secure the tire to the rim of a wheel.

5. A tire comprising an inner tube, a leather outer casing inclosing said inner tube upon the sides and adjacent the tread and having outwardly-turned edges, a fabric interposed between the filling and the casing, a strengthening-strip of leather with beveled edges interposed between the fabric and the casing and adjacent the tread, a base-band of leather connecting and having its edges secured to the outturned edges of the casing, a rigid binding-strip disposed upon the outturned edges and provided with openings registering with openings in the edges of the casing and base-band and adapted to permit the passage therethrough of bolts to secure the tire to the rim of a wheel and a tread-strip of leather removably secured to and without the casing.

In testimony whereof we affix our signatures in presence of two witnesses.

DAVID R. SALISBURY,
OLIVER D. SALISBURY.

Witnesses:
G. L. TAYLOR,
J. MATTISON.